(12) United States Patent
Takagi et al.

(10) Patent No.: US 7,192,063 B2
(45) Date of Patent: Mar. 20, 2007

(54) METALLIC TUBULAR HOSE HAVING A RUBBER OR RESIN HARD MATERIAL LAYER

(75) Inventors: Yuji Takagi, Komaki (JP); Minoru Hiramatsu, Kasugai (JP)

(73) Assignee: Tokai Rubber Industries, Ltd. (JP)

( * ) Notice: Subject to any disclaimer, the term of this patent is extended or adjusted under 35 U.S.C. 154(b) by 98 days.

(21) Appl. No.: 10/779,296

(22) Filed: Feb. 12, 2004

(65) Prior Publication Data

US 2004/0227343 A1    Nov. 18, 2004

(30) Foreign Application Priority Data

Feb. 12, 2003    (JP) .............................. 2003-034250

(51) Int. Cl.
*F16L 33/00*    (2006.01)
(52) U.S. Cl. ...................... 285/242; 285/256; 285/903; 138/109
(58) Field of Classification Search ................ 285/256, 285/903, 222.4, 382, 242; 138/109
See application file for complete search history.

(56) References Cited

U.S. PATENT DOCUMENTS

| | | | | |
|---|---|---|---|---|
| 5,349,988 | A * | 9/1994 | Walsh et al. ................. | 138/109 |
| 5,413,147 | A * | 5/1995 | Moreiras et al. ............ | 138/109 |
| 6,623,046 | B1 * | 9/2003 | Fritz et al. .................. | 285/242 |
| 6,631,741 | B2 * | 10/2003 | Katayama et al. ........... | 138/121 |
| 2004/0020545 | A1 * | 2/2004 | Takagi et al. ................ | 138/109 |
| 2004/0090065 | A1 * | 5/2004 | Furuta et al. ................ | 285/256 |
| 2004/0118470 | A1 * | 6/2004 | Furuta ......................... | 138/139 |
| 2004/0119283 | A1 * | 6/2004 | Furuta ......................... | 285/256 |

FOREIGN PATENT DOCUMENTS

| | | | |
|---|---|---|---|
| EP | 332853 | A1 * | 9/1989 |
| JP | S51-150511 | | 12/1976 |
| JP | 02129489 | A * | 5/1990 |
| JP | 2001-182872 | | 7/2001 |

* cited by examiner

*Primary Examiner*—Aaron Dunwoody
(74) *Attorney, Agent, or Firm*—Andrus, Sceales, Starke & Sawall, LLP

(57) ABSTRACT

The present invention relates to a metallic tubular hose which suppresses disintegration in which the metallic tubular hose comprises a hose body having a longitudinal edge at one end thereof and a bellows metallic tube inner layer with the inner layer composed of a corrugated bellows portion and a restricted portion, a jacket composed of a plurality of layers surrounding the inner layer, a rigid insert pipe extending into the hose body and a metallic sleeve engaging the hose body along said longitudinal edge for compressing said jacket against said rigid insert pipe wherein said plurality of layers in said jacket includes an inner layer adjacent to said restricted portion of said bellows metallic tube inner layer composed of a flexible and hard material possessing a tensile modulus of between 4 MPa and 8 MPa for a composition of rubber and about 300 MPa for a resin material composition and preferably between 1000 MPa and 6000 MPa.

12 Claims, 5 Drawing Sheets

——— 通常時
——— 加圧時

METALLIC TUBULAR HOSE HAVING A RUBBER OR RESIN HARD MATERIAL LAYER

FIELD OF THE INVENTION

The present invention relates to a metallic tubular hose comprising a bellows metallic tubular layer (hereinafter referred to as "bellows metallic tube") suitable for transporting automotive fuels, coolants, or other types of fluids.

BACKGROUND OF THE INVENTION

It is conventional to fabricate a hose from a composition of "NBR PVC" corresponding to a mixture of acrylonitrile butadiene rubber and polyvinyl chloride. A hose of this composition is typically used for transporting automotive fuels such as gasoline having low permeability. Regulation of the permeability properties of hoses in view of global environmental protection is expected to be imposed in the future. Moreover, a growing demand for a highly permeable fluid such as hydrogen gas or carbon oxide gas for a fuel cell is expected to obsolete a hose composed solely of an organic material (e.g. rubber, resin).

A hose comprising a bellows metallic tube in theory should permeate no fluid and should therefor be suitable for transporting fluids of very high permeability. Accordingly, even when hydrogen gas is used for a fuel cell, the permeability to hydrogen gas of a bellows metallic tube is "0," providing complete protection against leakage.

Hoses comprising a bellows metallic tube are known to the prior art as taught and described in Japanese patent publication No's: (1) Japanese Unexamined Patent (Kokai) No. 2001-182872; (2) U.S. Pat. No. 6,631,741; and (3) Japanese Unexamined Utility Model (Jikkai) No. S51-150511.

FIG. 3 is a diagram depicting one embodiment of a hose comprising a bellows metallic tube to be used herein as a comparative example in the explanation of the subject invention.

FIG. 3 shows a hose body 200 in cross section comprising a plurality of laminated layers with a bellows metallic tube 202 forming the innermost layer of the hose body; an elastic layer 204 laminated in a radial direction over the bellows metallic tube 202; a reinforcing layer 206 laminated over the elastic layer 204; and an outer layer 208 laminated over the reinforcing layer 206.

Inner layer 204 and outer layer 208 are both composed of an elastic material preferably of rubber.

Inner layer 204 is formed in such a manner that it fills the gaps formed in the valleys of the corrugated bellows portion 222 of the bellows metallic tube 202 as will be described later.

Reference Number 210 is a metallic sleeve externally mated to the longitudinal edge at one end of hose body 200. This is preferably accomplished by compressing the sleeve along the longitudinal edge of the hose body 200, against a rigid insert pipe 212 using, for example, a conventional crimping tool (not shown).

The metallic sleeve 210 compresses the longitudinal edge of the hose body 200 against the insert pipe 212 so that the compressed longitudinal edge is restricted from movement both inwardly and outwardly.

The bellows metallic tube 202 inner layer has a corrugated bellows portion 222 ("corrugated bellows portion") and an integral non-corrugated straight tube portion 214 ("straight portion") extending axially from the corrugated bellows portion 222. The straight portion 214 is externally mated to the insert pipe 212 upon crimping the sleeve 210.

The straight portion 214 has a section 216 ("extended section") which extends outwardly from the hose body 200 in an axial direction. The metallic sleeve 210 includes a flange 218 which abuts the longitudinal edge of the hose body 200 and extends transverse to the axial direction into a groove 220 formed in the rigid insert pipe 212 so that upon crimping the sleeve 210 against the pipe 212, the straight portion 214 will deform within the groove 220 to prevent sliding of the straight portion 214 in an axial direction.

Note that the diameter of the straight portion 214 is essentially equal to the maximum outer diameter of the peaks 222a in the corrugated bellows portion 222 when contracted as is illustrated in FIG. 5(A).

In a bellows metallic tube of this type, the corrugated bellows portions 222 stretches in an axial direction upon internal pressurization as illustrated in FIG. 4 (B).

When pressurized, the pitch of the bellows portion expands in an axial direction as illustrated in FIG. 5 (A), with its peaks 222a shrinking and its valleys 222b expanding. In other words, the peaks 222a and the valleys 222b contract or expand to reach the mean diameter (the mean value of the diameters of the peaks 222a and the valleys 222b) of the bellows portion 222.

In contrast, the straight portion 214 does not deform in a radial direction when it is internally pressurized. The result of internal pressurization is plotted in FIG. 5 (B) wherein a step is generated between the straight portion 214 and the adjacent bellows portion 222, generating a large localized deformation or stress on the corrugated bellows portion 222, specifically at the location adjacent the straight portion 214. The same phenomenon is observed in pressurizing tests in which the hose is repeatedly pressurized internally. Disintegration occurs at a point of stress (particularly at the first and second peaks 222a or valleys 222b) derived from large local distortion and resulting exhaustion.

The above description relates to an embodiment in which the straight portion 214 corresponds to a restricted portion formed at the longitudinal edge of the bellows tube 202. It would also apply to a restricted portion formed in accordance with the following alternative arrangements:

(1) directly welding one end of the bellows portion 222 onto the insert pipe 212; or (2) forming an imperfect bellows at one end of the bellows portion 222 to be used in place of the straight portion 214 with the imperfect bellows having corrugations initially made larger than the corrugations of the bellows portion 222 while the differential diameter between peaks and valleys is made small. Any of the above alternatives would result in the same problem as long as it functions to form a restricted portion in the inner layer at the longitudinal edge of the bellows tube 202.

The above examples are described with reference to hoses for transporting hydrogen gas for use in fuel cells. These problems, however, are commonly observed in hose applications including (1) transporting a fuel (e.g. gasoline), where a hose is exposed to high temperature and high pressure (where low-gasoline permeability becomes a crucial issue) to protect air from gasoline contamination or to provide larger outputs from equipment; (2) transporting carbon dioxide in the form of a fluid, whose molecular weight is small, resulting in high permeability; and (3) other fields where gas permeability regulations are stringent.

SUMMARY OF THE INVENTION

The metallic tubular hose of the present invention overcomes the stress problems referred to above.

The metallic tubular hose of the present invention comprises a hose body having a longitudinal edge at one end thereof and a bellows metallic tube inner layer with the inner layer composed of a corrugated bellows portion and a restricted portion, a jacket composed of a plurality of layers surrounding the inner layer, a rigid insert pipe extending into the hose body and a metallic sleeve engaging the hose body along said longitudinal edge for compressing said jacket against said rigid insert pipe wherein said plurality of layers in said jacket includes an inner layer adjacent to said restricted portion of said bellows metallic tube inner layer composed of a flexible and hard material possessing a tensile modulus of between 4 MPa and 8 MPa for a composition of rubber and at least 300 MPa for a resin material composition but preferably between 1000 MPa and 6000 MPa.

In the preferred embodiment of the metallic tubular hose the restricted portion of the inner layer is a linear and straight portion.

At least the layer surrounding the innermost layer is made of a hard rubber or resin material. When a rubber material is selected, Mo 100 (Modulus at 100% stretch) of the hard material should be between 4 MPa and 8 MPa and when a resin material is selected the tensile modulus should be above 300 MPa and preferably between 1000 MPa and 6000 MPa.

Figure 3:
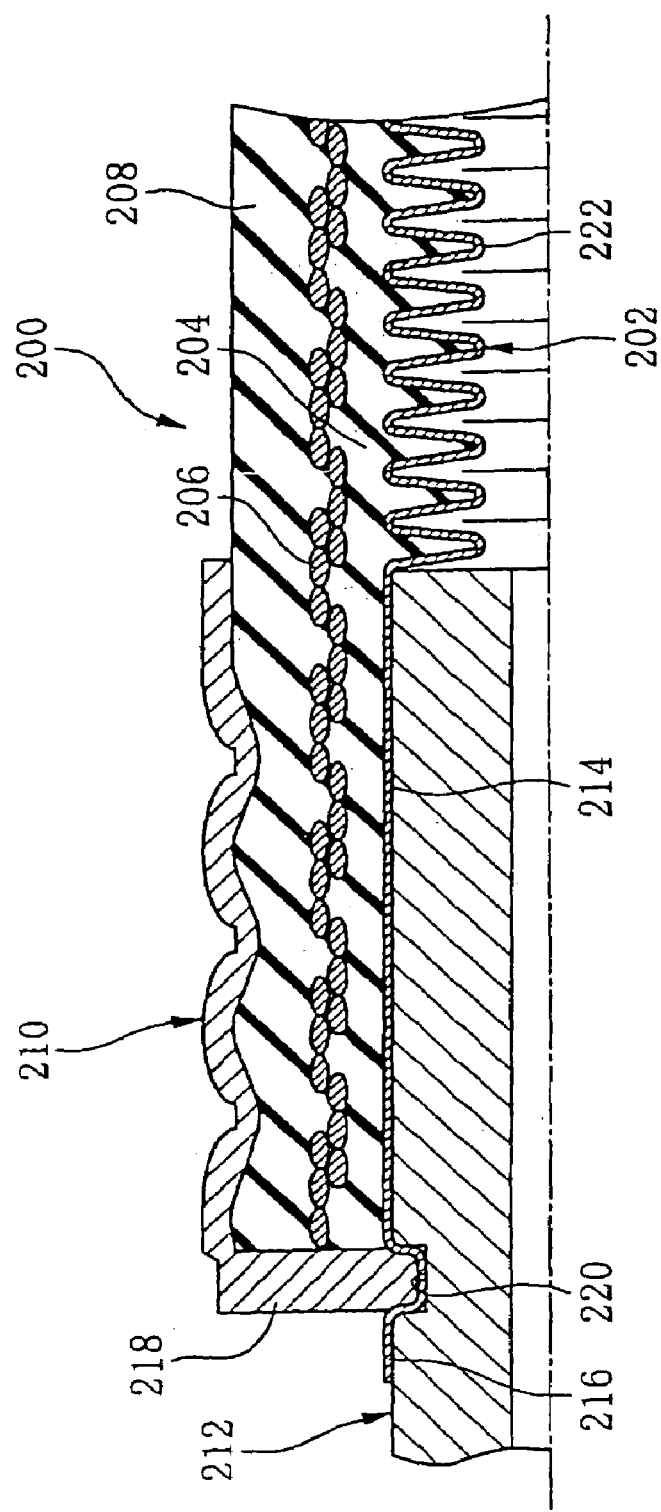
FIG. 3 is a diagram illustrating a major portion of an alternate embodiment of the present invention.
Figure 4A:
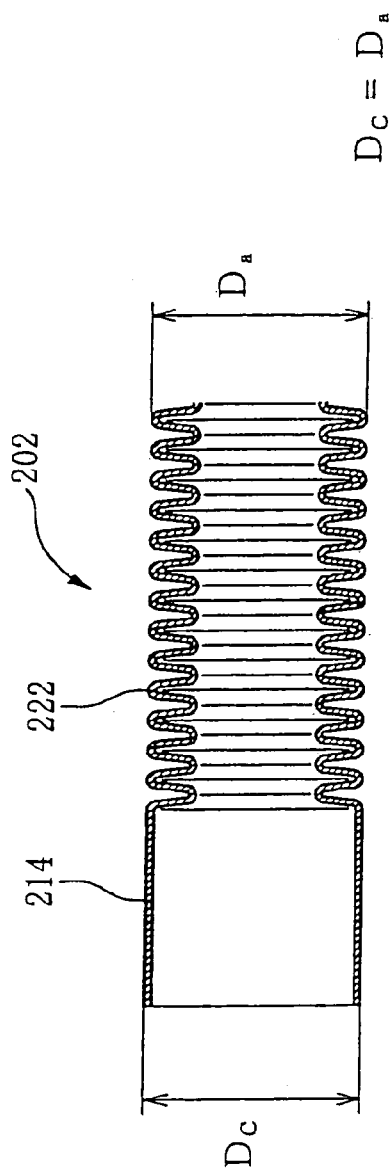
FIGS. 4A and 4B are diagrams depicting the bellows metallic tube hose before and after it is stretched respectively.
Figure 4B:
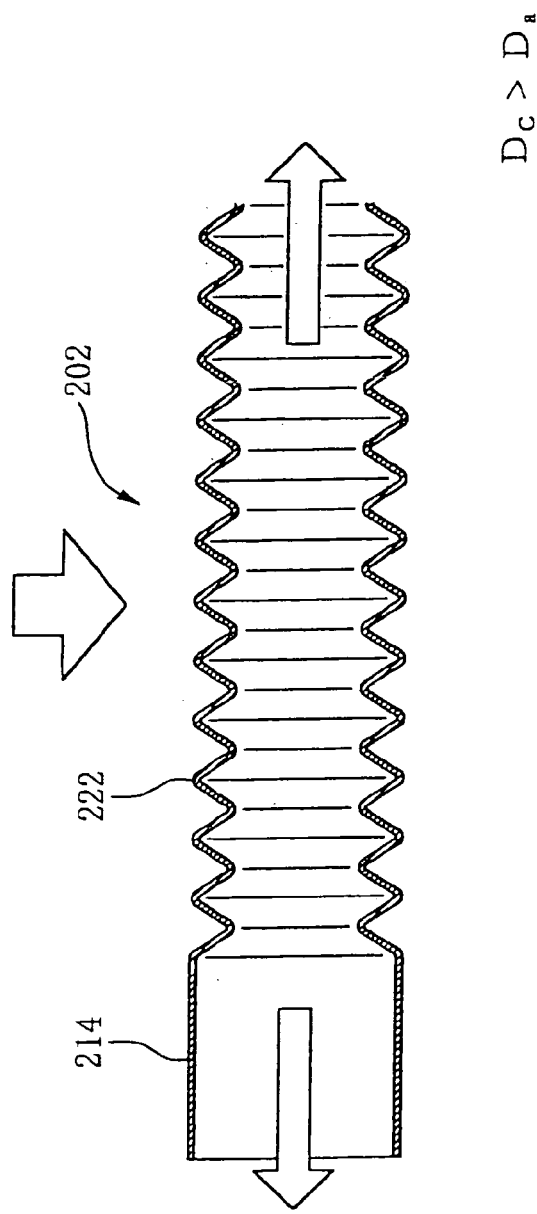
Figure 5A:
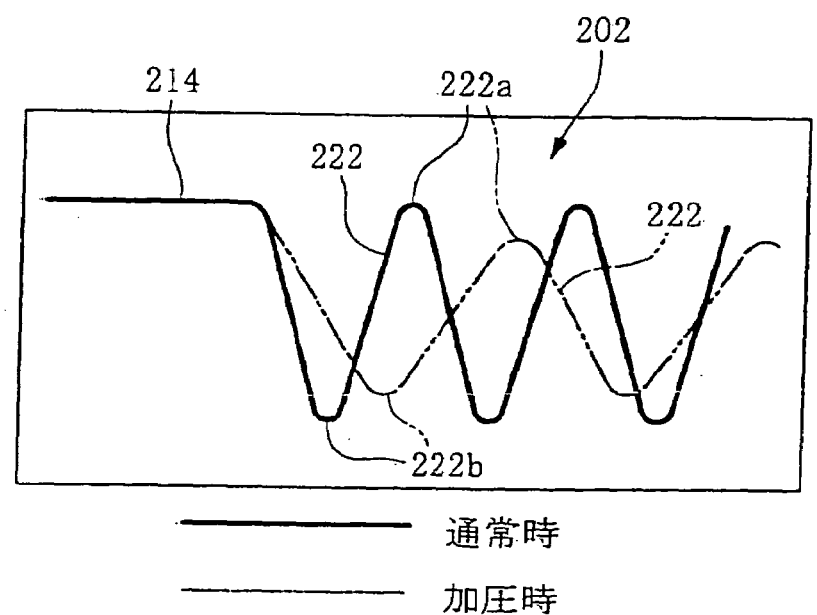
FIGS. 5A and 5B are diagrams illustrating a potential problem in the comparative hose configuration of FIG. 3.
Figure 5B:
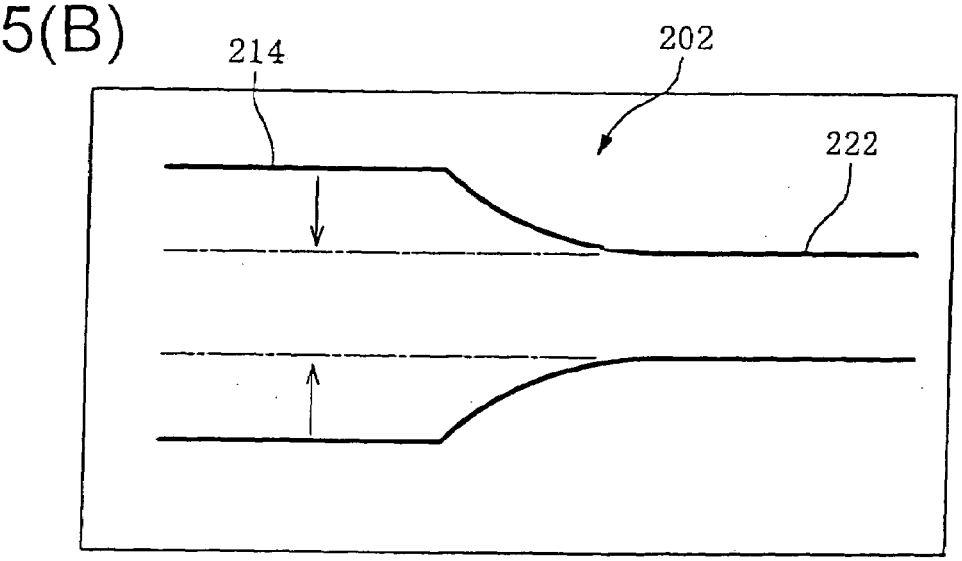

In the metallic tubular hose illustrated in FIG. 3, even though the reinforcement layer 206 is present, the bellows portion 222 stretches causing a large local deformation at the junction between bellows portion 222 and the straight portion (restricted portion) 214, causing disintegration. This results from internal pressurization which stretches the inner layer 204 between bellows portion 222 and the reinforcing layer 206 in a longitudinal direction, allowing a large relative sliding of the bellows portion 222. In other words, reinforcing layer 206 does not reinforce bellows portion 222 very well.

This problem is overcome by using a material for layer 204 between the bellows metallic tube and the reinforcing layer, more specifically, at least the layer between the straight portion 214 and the reinforcing layer which has a very hard but flexible material composition. According to the present invention, when the bellows metallic tube hose is internally pressurized, the portion between the perfect bellows portion and the reinforcing layer, specifically, the layer between the longitudinal ends of the restriction portion in the perfect bellows portion is restricted from stretching.

The reinforcing layer effectively reinforces the bellows portion via the layer between the bellows portion and the reinforcing layer, thereby effectively suppressing longitudinal stretching of the bellows portion by minimizing deformation at the restricted end of the bellows portion. Breakage of the bellows metallic tube induced by a large local deformation or stress is thus prevented.

The layer between the bellows metallic tube and the reinforcing layer may be made of the above hard material throughout the hose length.

As illustrated in the comparative example of FIG. 3, the present invention is suited to a hose structure in which the restricting portion is a linear straight portion integrally formed with the restricted end of the bellows portion.

The present invention is also applicable to cases wherein: (1) one end of the bellows metallic tube is directly welded to an insert pipe or otherwise similarly connected such that the insert pipe provides a restricted portion; and/or (2) an imperfect bellows portion is integrally formed at the longitudinal edge end of the bellows metallic tube for forming the restricted portion.

DETAILED DESCRIPTION OF PREFERRED EMBODIMENTS

Additional embodiments of the present invention are described herein with reference to the drawings.

Figure 1:
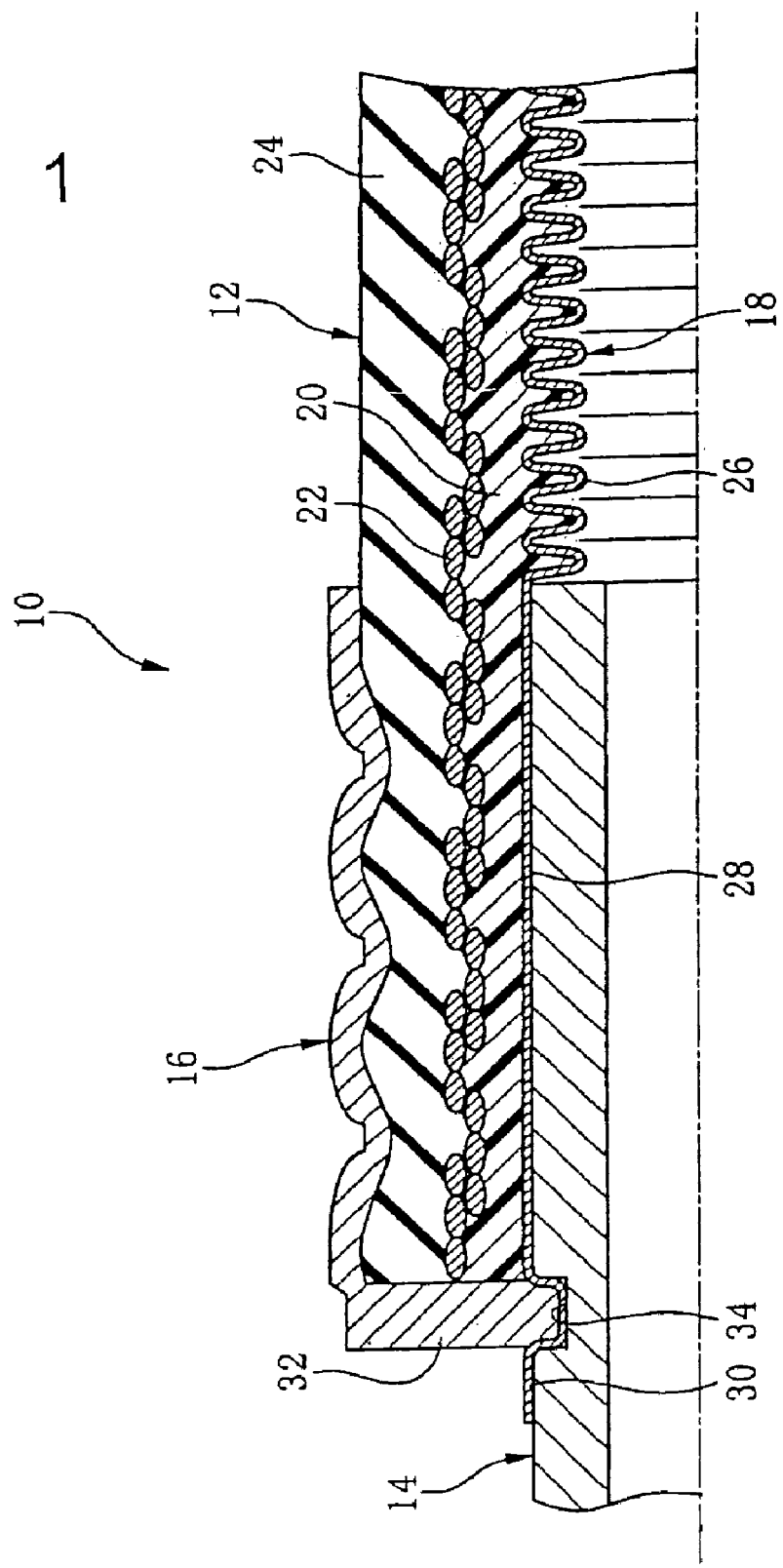
FIG. 1 is a diagram illustrating the bellows metallic tube hose of the present invention.
Figure 2A:
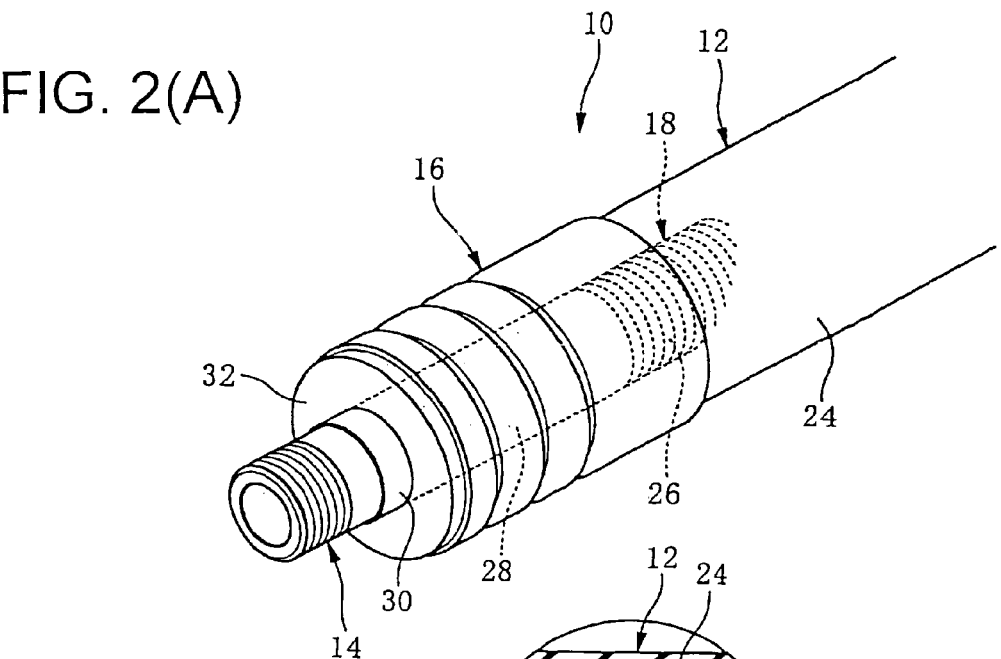
FIGS. 2(A) and 2(C) are partial perspective views of the metallic tubular hose of FIG. 1
Figure 2B:
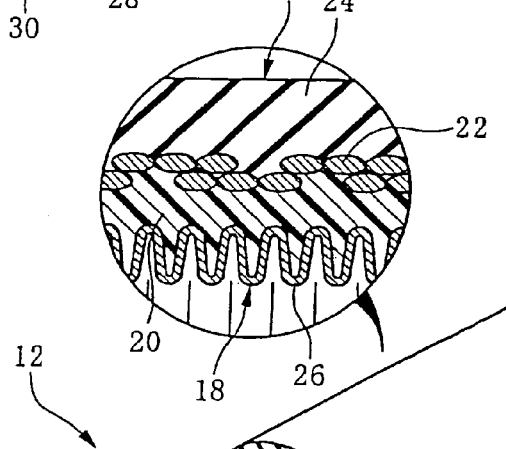
FIG. 2(B) is a cross sectional view of a major portion of the bellows metallic tube of FIG. 2.
Figure 2C:
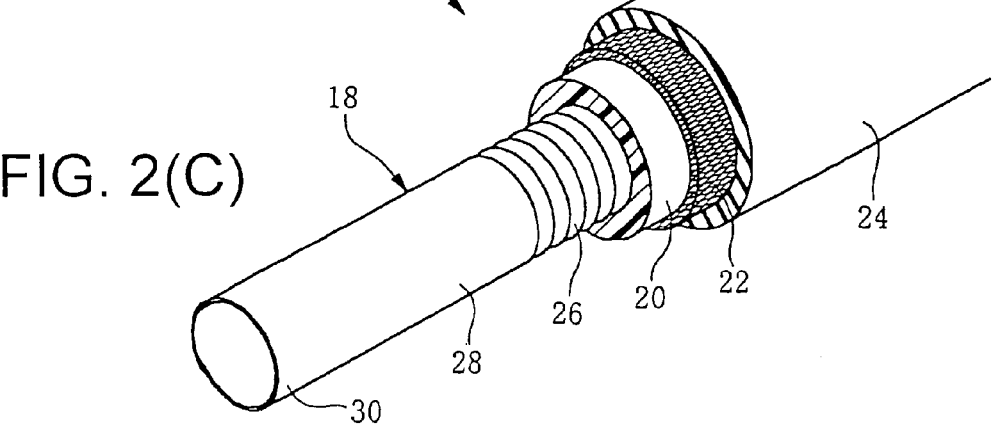

In FIGS. 1 and 2, Reference Number 10 is a metallic tubular hose (hereinafter referred to as "hose") suitable for transporting hydrogen, automobile fuels, air conditioning coolants, and the like; 12 is the hose body, 14 is a metallic insert pipe fixed onto hose body 12; and 16 is a metallic sleeve externally mated to a longitudinal edge of hose body 12 at one end thereof.

Metallic sleeve 16 is crimped inwardly in a radial direction using a crimping tool (not shown). This secures the metallic sleeve 16 to the insert pipe 14 in such a manner that metallic sleeve 16 (top) and insert pipe 14 (bottom) together pinch the longitudinal edge of the hose body in a radial direction.

The hose body 12, comprises: a bellows metallic tube 18, which is the innermost layer upon which is laminated a first layer 20 on the outer circumference thereof; a reinforcing layer 22; and an outer layer 24. The outer layer is integrally bonded using a vulcanizing adhesive or the like.

In this embodiment, the first layer 20, the reinforcing layer 22, and the outer layer 24 constitute a jacket surrounding the bellows metallic tube 18.

Reinforcing layer 22 is composed of braided wires wrapped in opposite directions, i.e., wound alternately at a given angle around the first layer 20 and may be a layer reinforced with fibers or wires.

The outer layer 24 may be made of a resilient material such as rubber and the like.

The bellows metallic tube 18 has a corrugated bellows portion 26, which provides flexibility for the tubular hose 10.

In other words, even though the innermost layer of the hose 10 is a bellows metallic tube 18, the bellows portion 26 of the metallic tube 18 provides the overall flexibility for the hose 10.

Desirable materials for the bellows metallic tube 18 include steel (including stainless steel), copper, copper alloys, aluminum, aluminum alloys, nickel, nickel alloys, titanium, titanium alloys, and the like. Among these, stainless steel is the most desirable material.

The thickness of the stainless steel may be 20–500 μm, however, 50 μm or more is desirable to provide the bellows portion 26 with protection from defects (e.g. pin holes) and for maintenance and machinability thereof. To assure flexibility or durability a maximum thickness of 300 μm or less is desirable.

The bellows metallic tube 18 includes an integrally formed straight portion (restriction portion) 28 disposed at the longitudinal edge of the hose body which is then externally mated with the insert pipe 14 by crimping the metallic sleeve 16.

The straight portion 28 has a section 30 extending outwardly in an axial direction from the hose 10. The straight portion 28 is surrounded by an inner elastic layer 20, a reinforcing layer 22 and outer layer 24. The corrugated bellows portion 26 is an extension of the straight portion 28. The sleeve 16 has a flange 32 which engages a groove 34 formed in the insert pipe 14 to prevent the straight portion 28 from disintegration in an axial direction.

In this embodiment, the over all inner layer 20 including the edge of the bellows portion 26 at the junction of the straight portion 28 and the reinforcing layer 22 are composed of a flexible hard resin material having a minimum tensile modulus of 4 MPa or larger Hard materials suited to the inner layer 20 include the following: polyamide, denatured polyamide (which is a mixture of polyamide and denatured polyolefin containing a carboxylic group), and the like such as PE (polyethylene), PP (polypropylene), PET (polyethylene terephthalate), PBT (polybutylene terephthalate), PBN (polybutylene paphthlate), PVDF (polyvinylidene di-fluoride), ETFE (ethylene tetrafluoroethylene copolymer), PPS (phenylene sulfide), ABS (acrylonitrile butadiene styrene), and EVA(ethylene vinyl alcohol).

Examples of desirable polyamides include polyamide 6, polyamide 11, polyamide 12, polyamide 4-6, polyamide 6-6, polyamide 6-10, polyamide 6-12, polyamide MXD-66 or copolymers of two or more of the above polyamides.

A desirable denatured polyolefin containing a carboxylic group includes olefins such as ethylene, propylene, butadiene, and the like. It also includes denatured polyolefins containing about 0.1–10 mol % of a functional group introduced during polymerization or copolymerization of diene monomers to produce polyolefin, followed by graft polymerization with maleic acid anhydride.

The proportion between polyamide and denatured polyolefin in the denatured polyamide mixture as referred to above is within a range of 90/10–50/50 by weight and more desirably between 65/35–55/45 by weight.

The larger the proportion of denatured polyolefin, the softer the hose 10 and the poorer the resistance to gas permeability. Stated otherwise, the smaller the proportion of denatured polyolefin, the better its gas permeability resistance but the hose 10 is less soft.

More specifically, examples of desirable denatured polyamides include the trade name series of Zytel ST (e.g. Zytel ST 801, Zytel ST 811, Zytel ST 811HS, etc.) manufactured by DuPont wherein the denatured polyamide of the Zytel ST series is an alloy of polyamide 6 and maleic acid anhydride denatured polyolefin.

The desirable minimum thickness of the inner layer 20 is 0.05 mm or more for purpose of moldability and gas permeability resistance; and in view of flexibility, the maximum thickness is 0.5 mm or less.

The above are examples of resin materials. However, a very hard rubber material may also be used for inner layer 20 in which case the rubber should have a tensile modulus of 4 MPa and up to 8 MPa.

Examples of rubber materials having such a high hardness include silicone rubber, chloroprene rubber, chlorosulfonated polyethylene, butyl rubber, halogenated butyl rubber, acrylic rubber, EPM, EPDM, nitrile rubber, and the like.

Silicone rubbers (VMQ, FVMQ) are highly resistant to heat, cold, and ozone and excellent in electrical properties and non-adhesiveness.

Chloroprene rubber (CR) is a material having well balanced properties providing excellent mechanical strength and weather (humidity) resistance and a reasonable resistance to chemicals, heat, cold, and oil.

Chlorosulfonated polyethylene (CSM) has chlorine atoms in its structure in the same manner as chloroprene rubber but without any double bonds. It provides better resistance to weather (humidity), ozone, heat, chemicals and the like similar to chloroprene rubber.

Butyl rubber (IIR) which is a copolymer of isobutyl and isoprene has excellent resistance to heat, cold, and weather (humidity) and also has a reasonable resistance to ester phosphate oils, water and chemicals.

Halogenated butyl rubber (X-IIR) has good gas impermeability, electrical properties, and resistance to ozone, aging, electrical properties, chemicals and the like. It has better resistance to heat and better adhesiveness to metals than butyl rubber.

Acryl rubber (ACM) has a resistance to heat comparable to silicone rubber and fluorine rubber; a resistance to oil comparable to fluorine rubber, nitrile rubber, and Hydrine rubber. It has a better resistance to oil, particularly at a high temperature, than nitrile rubber or Hydrine rubber. As such, acrylic rubber has particularly excellent resistance to heat and oil. Further, it is affordable and cost effective.

EPM and EPDM are similar to butyl rubber (IIR) which is also non-diene and non-polar rubber. It has somewhat better resistance to ozone and heat-aging by heat than butyl rubber. It further has excellent weather (humidity) resistance and is resistant to cold, polarity, solvents, and inorganic chemicals.

The properties of nitrile rubber (NBR) made of an acrylonitrile-butadiene copolymer is determined by the acrylonitrile content. As the amount of nitrile is increased, resistance to mineral oils and hydrocarbon fuels increases but its flexibility at lower temperatures drops significantly.

The structure of nitrile rubber has unsaturated bonds and has poor resistance to weather (humidity) but has relatively good resistance to permanent shrinkage, stretch, and abrasion.

According to this embodiment, when hose 10 is internally pressurized, the longitudinal stretching of the inner layer 20 is suppressed.

As a result, reinforcing layer 22 is better able to reinforce the bellows 26 via inner layer 20.

A large local distortion or stress generated near the portion close to straight portion 28 is thus suppressed increasing the life of bellows metallic tube 18.

REFERENCE SYMBOLS 10 bellows metallic tube hose
12 hose body
16 metallic socket
18 bellows metallic tube
20 inner layer 22 reinforcing layer
24 outer layer
26 bellows portion (perfect bellows portion)
28 straight tube (restricting portion)

We claim:

1. A metallic tubular hose comprising a hose body having a longitudinal edge at one end thereof and a bellows metallic tube inner layer with the bellows metallic tube inner layer composed of a corrugated bellows portion and a restricted non-corrugated straight portion having a uniform thickness, a jacket composed of a plurality of layers surrounding the inner layer, a rigid insert pipe extending into the hose body with said rigid insert pipe having a groove adjacent said one end of the hose body and a metallic sleeve for engaging the hose body along said longitudinal edge; wherein said metallic sleeve includes a flange located in alignment with said groove in said pipe and wherein said restricted non-corrugated straight portion extends axially beyond said longitudinal edge of said hose body and said flange such that upon compressing said jacket against said rigid insert pipe said flange engages said groove with said extended non-corrugated straight portion held securely between said flange and groove at said one end of the hose body and wherein said plurality of layers in said jacket includes an inner layer contiguous to said restricted non-corrugated straight portion of said bellows metallic tube inner layer which is composed of a flexible and hard material of a rubber or resin composition possessing a tensile modulus of between 4 MPa and 8 MPa for a composition of rubber and above 300 MPa for a resin material composition.

2. A metallic tubular hose as defined in claim 1 wherein the tensile modulus of said resin composition is between 1000 MPa and 6000 MPa.

3. A metallic tubular hose as defined in claim 1 wherein said restricted portion is commensurate in length with said longitudinal edge.

4. A metallic tubular hose as defined in claim 3 wherein said jacket further includes a reinforcing layer laminated over said inner layer and an outer layer.

5. A metallic tubular hose as defined in claim 1 wherein said inner layer in said jacket has a thickness of between 0.05 mm and 0.5 mm.

6. A metallic tubular hose as defined in claim 1 wherein said inner layer in said jacket is composed of a rubber material selected from the group consisting of: silicone rubber, chloroprene rubber, chlorosulfonated polyethylene, butyl rubber, halogenated butyl rubber, acrylic rubber, EPM, EPDM, nitrile rubber, and mixtures thereof.

7. A metallic tubular hose as defined in claim 5 wherein said inner layer in said jacket is composed of a rubber material selected from the group consisting of: silicone rubber, chloroprene rubber, chlorosulfonated polyethylene, butyl rubber, halogenated butyl rubber, acrylic rubber, EPM, EPDM, nitrile rubber, and mixtures thereof.

8. A metallic tubular hose as defined in claim 5 wherein said inner layer in said jacket is composed of a resin material selected from the group consisting of: polyamide, denatured polyamide, PE, PP, PET, PBT, PBN, PVDF, ETFE, PPS, ABS, EVA and mixtures thereof.

9. A metallic tubular hose as defined in claim 8 wherein said denatured polyamide is a mixture of polyamide and denatured polyolefin containing a carboxylic group.

10. A metallic tubular hose as defined in claim 8 wherein said polyamide is selected from the group consisting of polyamide 6, polyamide 11, polyamide 12, polyamide 4-6, polyamide 6-6, polyamide 6-10, polyamide 6-12, polyamide MXD-66 or copolymers of two or more of the polyamides in the group.

11. A metallic tubular hose as defined in claim 9 wherein said mixture is in a proportional range by weight between polyamide and denatured polyolefin of 90/10–50/50.

12. A metallic tubular hose as defined in claim 11 wherein said proportional range lies between 65/35–55/45.

* * * * *